(12) United States Patent
Peregrine et al.

(10) Patent No.: US 11,042,523 B2
(45) Date of Patent: Jun. 22, 2021

(54) DATA CURATION SYSTEM WITH VERSION CONTROL FOR WORKFLOW STATES AND PROVENANCE

(71) Applicant: Tamr, Inc., Cambridge, MA (US)

(72) Inventors: Vladimir Gluzman Peregrine, Arlington, MA (US); Ihab F. Ilyas, Waterloo (CA); Michael Ralph Stonebraker, Moultonborough, NH (US); Stan Zdonik, Westwood, MA (US); Andrew H. Palmer, Cambridge, MA (US); Alexander Richter Pagan, Woodside, NY (US); Daniel Meir Bruckner, San Francisco, CA (US); George Beskales, Waltham, MA (US); Aizana Turmukhametova, Somerville, MA (US); Tianyu Zhu, Medford, MA (US); Kanak Kshetri, Arlington, MA (US); Jason Liu, Wellesley, MA (US); Nikolaus Bates-Haus, Littleton, MA (US)

(73) Assignee: TAMR, INC., Cambridge, MA (US)

( * ) Notice: Subject to any disclaimer, the term of this patent is extended or adjusted under 35 U.S.C. 154(b) by 12 days.

(21) Appl. No.: 16/710,680

(22) Filed: Dec. 11, 2019

(65) Prior Publication Data
US 2020/0117643 A1 Apr. 16, 2020

Related U.S. Application Data

(63) Continuation of application No. 16/053,291, filed on Aug. 2, 2018, which is a continuation of application No. 14/474,919, filed on Sep. 2, 2014, now abandoned, which is a continuation of application No. 14/460,145, filed on Aug. 14, 2014, now abandoned.

(51) Int. Cl.
*G06F 17/00* (2019.01)
*G06F 16/21* (2019.01)
*G06F 16/215* (2019.01)

(52) U.S. Cl.
CPC .......... *G06F 16/219* (2019.01); *G06F 16/215* (2019.01)

(58) Field of Classification Search
CPC ............................ G06F 16/219; G06F 16/215
See application file for complete search history.

(56) References Cited

U.S. PATENT DOCUMENTS

| | | | |
|---|---|---|---|
| 6,925,468 B1 * | 8/2005 | Bobbitt | G06Q 40/00 707/703 |
| 7,054,823 B1 | 5/2006 | Briegs et al. | |
| 7,873,589 B2 | 1/2011 | Shiffman et al. | |

(Continued)

OTHER PUBLICATIONS

Stonebraker et al., "Data Curation at Scale: The Data Tamr System," 6th Biennial Conference on Innovative Data Systems Research, Jan. 6-9, 2013, Asilomar, California, online at www.cidrdb.org/cidr2013/Papers/CIDR13)Paper28.pdf.

*Primary Examiner* — Hasanul Mobin
(74) *Attorney, Agent, or Firm* — Panitch Schwarze Belisario & Nadel LLP (57) ABSTRACT

A data curation system is provided that includes various methods to enable efficient reuse of human and machine effort. To reuse effort, various facilities are presented that model, save, and allow for querying of provenance and state information of a curation workflow and allow for incremental, stateful transitions of the data and metadata thereof.

20 Claims, 7 Drawing Sheets

(56) References Cited

U.S. PATENT DOCUMENTS

| | | |
|---|---|---|
| 7,970,630 B2 | 6/2011 | Fagan et al. |
| 8,600,683 B2 | 12/2013 | George |
| 9,996,623 B1 | 6/2018 | Ferrill et al. |
| 2005/0262188 A1 | 11/2005 | Mamou et al. |
| 2006/0136188 A1 | 6/2006 | Lacey et al. |
| 2008/0133270 A1 | 6/2008 | Michelson et al. |
| 2009/0138415 A1 | 5/2009 | Lancaster |
| 2010/0083230 A1 | 4/2010 | Ramakrishnan et al. |
| 2010/0145902 A1 | 6/2010 | Boyan et al. |
| 2010/0228699 A1 | 9/2010 | Webber et al. |
| 2011/0029520 A1 | 2/2011 | Leary et al. |
| 2011/0191303 A1* | 8/2011 | Kaufman ................ G06F 16/21 707/684 |
| 2012/0011428 A1 | 1/2012 | Chisholm |
| 2012/0023393 A1 | 1/2012 | Tomasic et al. |
| 2012/0197868 A1* | 8/2012 | Fauser ............... G06F 16/2471 707/714 |
| 2013/0073994 A1 | 3/2013 | Liao et al. |
| 2013/0091170 A1 | 4/2013 | Zhang et al. |
| 2013/0339366 A1* | 12/2013 | Khimich ............ G06F 16/2228 707/741 |
| 2014/0215303 A1* | 7/2014 | Grigorovitch ........ G06F 40/106 715/229 |
| 2014/0250145 A1* | 9/2014 | Jones .................. G06Q 10/101 707/769 |
| 2014/0358931 A1* | 12/2014 | Garera ................. G06F 16/258 707/740 |
| 2015/0310084 A1* | 10/2015 | Raman ................. G06F 16/285 707/738 |
| 2015/0347517 A1* | 12/2015 | Cohoon ............. G06F 16/2425 707/769 |
| 2016/0098405 A1* | 4/2016 | Gorbansky ....... G06F 16/24578 707/749 |
| 2016/0378832 A1* | 12/2016 | Zhuge .................. G06F 16/214 707/752 |
| 2017/0039527 A1* | 2/2017 | Rangan ............. G06Q 10/1095 |
| 2018/0374512 A1* | 12/2018 | Celinski .............. G11B 27/031 |

* cited by examiner

```
public List<StateElement>
propagateChanges(List<StateElement> proposedChanges) {
    // descendantsOf uses the provenance DAG
    List<StateElement> descendantsOfChanges =
descendantsOf(proposedChanges);
    // Topological sort to ensure all ancestors of an
element are considered
    // before the element.
    // The topological sort uses the provenance DAG
    List<StateElement> possiblyAffectedElements =
topologicalSort(descendantsOfChanges);
    List<StateElement> noLongerValidElements = new
ArrayList<>( );
    for(StateElement element:possiblyAffectedElements){
    if(isElementStillValid(element)) { // skip links
from elements that are not invalidated
      continue;
    }
    noLongerValidElements.add(element);
    for(StateElement child :
element.getDirectDescendants( )) {
      updateProvenance(child);
    }
  }
  return noLongerValidElements;
}
```

FIG. 7

DATA CURATION SYSTEM WITH VERSION CONTROL FOR WORKFLOW STATES AND PROVENANCE

CROSS-REFERENCE TO RELATED APPLICATIONS

This utility patent application is a continuation of and claims priority from copending U.S. patent application Ser. No. 16/053,291, filed Aug. 2, 2018, which is a continuation of and claims priority from copending U.S. patent application Ser. No. 14/474,919, filed Sep. 2, 2014, titled "DATA CURATION SYSTEM WITH VERSION CONTROL FOR WORKFLOW STATES AND PROVENANCE" naming inventors Vladimir Gluzman Peregrine, Ihab F. Ilyas, Michael Ralph Stonebraker, Stan Zdonik, Andrew H. Palmer, Alexander Richter Pagan, Daniel Meir Bruckner, George Beskales, Aizana Turmukhametova, Tianyu Zhu, Kanak Kshetri, Jason Liu, and Nikolaus Bates-Haus, now abandoned, which is a continuation of and claims priority from U.S. patent application Ser. No. 14/460,145, filed Aug. 14, 2014, titled "DATA CURATION SYSTEM WITH VERSION CONTROL FOR WORKFLOW STATES AND PROVENANCE", naming inventors Nikolaus Bates-Haus, George Beskales, Vladimir Gluzman Peregrine, Ihab F. Ilyas, Kanak Kshetri, Daniel Meir Bruckner, Andrew H. Palmer, Michael Ralph Stonebraker, Jason Liu, Aizana Turmukhametova, Tianyu Zhu, and Alexander Richter Pagan, now abandoned. The disclosures of each of the above-identified applications are incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2018 Tamr, Inc.

BACKGROUND OF THE INVENTION

Field of the Invention

This invention relates to cleaning, transforming, integrating, and deduplicating data from multiple data sources. More specifically, the invention is a data curation system, including various methods to enable efficient reuse of human and machine effort. To reuse effort, various facilities are presented that model, save, and allow the querying of provenance and state information of a curation workflow and allow for incremental, stateful transitions of the data and the metadata. Products and services embodying the invention operate in the markets including data cleaning, record deduplication, data integration, data quality, and data transformation.

Background

Systems such as those provided by Informatica, Oracle's Silver Creek Systems, and IBM InfoSphere QualityStage are used to integrate data coming from different data sources, standardize data formats (e.g., dates and addresses), and remove errors from data (e.g., duplicates). These systems typically depend on a data expert (i.e., a human that has knowledge about the semantics of the data) to manually specify low-level procedures to clean the data. Coming up with an efficient and effective data integration plan mainly depends on the skills of the data expert. The audience targeted by such systems are assumed to be extremely familiar with the data (e.g., experienced in data analytics).

Two major challenges facing such systems are scale and state.

Regarding scale. Existing systems do not scale to the sizes of problems currently found in the field. For example, one web aggregator requires the data curation of 80,000 URLs, and a second biotech company has the problem of curating 8,000 spreadsheets. At this scale, data curation cannot be a manual (human) effort, but it must entail machine-learning approaches with a human assist only when necessary. Existing systems involve a large amount of manual effort (e.g., selecting which machine learning algorithm to use, what training data to collect, what candidate generation criteria to use, etc.). Also, existing systems assume that the user is extremely familiar with the data, which is not necessarily the case in practice.

Regarding state. Data integration workflow is an iterative process. For example, in a medical database, if one data source includes a field called "room number" and a second data source also includes a field called "room number," then a data curator (i.e. system operator) may make the initial decision that the first field and second field contain the same data. Later, the system operator may learn that the first field referred to "doctor's room number" and the second field referred to "patient's room number," so the initial decision about these fields was incorrect. In the interim, however, other actions (such as record deduplication and schema mapping) would have been taken on the data, actions which may or may not need to be undone. The system operator now needs to go back in time to a previous version of the data, understand which decisions were made and why, reuse previous man and machine efforts where possible, and consider the implications of decisions on the future state of the data. At each state, metadata, such as what decisions were made and why, exist but are not necessarily tracked. As can be appreciated, multiple versions (e.g. parent and child) and paths (or branches) are possible, but current systems do not provide for efficient version tracking, management, or control.

DESCRIPTION OF PRIOR ART

U.S. Patents

U.S. Pat. No. 7,970,630 (issued 2011 Jun. 28, name Fagan et al., title "INTEGRATED BIOMEDICAL INFORMATION PORTAL SYSTEM AND METHOD") discloses, in the Abstract, "A computer-implemented system and method for integrating data from a plurality of biomedical development phases. The system and method include a database that stores data collected from the biomedical development phases. The database further includes a metadata data structure that describes the data collected during a biomedical development phase. At least one graphical user interface collects data during the biomedical development phase. The structure of the graphical user interface is defined based at least in part upon the metadata data structure so that the graphical user interface collects data points as well as metadata that is to be stored within the metadata data structure. The metadata describes the collected data points, and at least a portion of the metadata data structure is determined based upon an issue that arises in a subsequent biomedical development phase."

A system for storing in one place the metadata and data related to a treatment in development by a pharmaceutical company or similar enterprise. The system stores raw data, metadata, genomic information. It assists with data entry and with making the data and metadata available to the right people at the right times. However, it is primarily a storage and retrieval system. This system does not enable its users to enrich the data in any significant way, nor does it provide any general-purpose enrichment tools.

U.S. Patent Application Publications

United States Patent Application Publication 2009/0138415 (published 2009 May 28, name Lancaster, title "AUTOMATED RESEARCH SYSTEMS AND METHODS FOR RESEARCHING SYSTEMS") discloses, in the Abstract, "Systems and methods that provide for automated research into the workings of one or more studied systems include automated research software modules that communicate with domain knowledge bases, research professionals, automated laboratories experiment objects, and data analysis processes, wherein automatically selected experiment objects can be run at an automated laboratory to produce experimental results, and the subsequent data-processing providing automated guidance to a next round of experiment choice and automated research. An Experiment Director rules engine chooses Experiment Objects based on user input through a Query Manager."

A system for self-guided research. Essentially, under loose supervision this system explores the parameters of some real-world complex system, such as the Earth's climate or a human cell and attempts to draw conclusions. This system improves the throughput of automated experiment frameworks such as cellular assays by providing quick decisions of which experiments might be done next to maximize the amount learned from the experiments. The degree of interactions with humans seems to be limited to providing some initial hints about which parameters might be worth investigating. It does not involve a human curator or human experts, nor enable them to save time and reuse past work.

United States Patent Application Publication 2010/0228699 (published 2010 Sep. 9, name Webber et al., title "SYSTEM AND METHOD FOR INTERACTING WITH CLINICAL TRIAL OPERATIONAL DATA") discloses, in the Abstract, "A method and system for exchanging clinical trial operational data by using a centralized shared server system connected to a plurality of shared servers. The system and method manage a plurality of clinical trial-related applications by creating a plurality of tables stored within the shared database of the shared database system connected to a centralized shared server system within a virtual network for updating and sharing among clinical trials. The current system and method allow exchanging clinical trial operational data between a centralized shared server system and a plurality of shared servers to delegate responsibility to other clinical trial organization users for producing subsets of clinical trial operational data with limited data access rights. The current system and method allow assigning data access rights to other clinical trial organizations by configuring the at least one other clinical trial organization as either a producer or a consumer of the clinical trial operational data for limiting access to the at least one table with the clinical trial operational data by the at least one other clinical trial organization. The current system and method allow each business partner to manage the assigned responsibilities by using existing clinical trial management systems applications and to maintain views of other clinical trial organizations activities of clinical trial operational data subject to assigned data access rights."

This system is mainly about sharing and security in managing clinical trials data and ensuring the appropriate people—and only the appropriate people—are able to see the data easily. There is no functionality for proposing enhancements or links in the data, nor any curation capabilities.

United States Patent Application Publication 2013/0091170 (published 2013 Apr. 11, name Zhang et al., title "MULTI-MODALITY, MULTI-RESOURCE, INFORMATION INTEGRATION ENVIRONMENT") discloses, in the Abstract, "A multi-modality, multi-resource, information integration environment system is disclosed that comprises: (a) at least one computer readable medium capable of securely storing and archiving system data; (b) at least one computer system, or program thereon, designed to permit and facilitate web-based access of the at least one computer readable medium containing the secured and archived system data; (c) at least one computer system, or program thereon, designed to permit and facilitate resource scheduling or management; (d) at least one computer system, or program thereon, designed to monitor the overall resource usage of a core facility; and (e) at least one computer system, or program thereon, designed to track regulatory and operational qualifications."

A system for coordinated presentation and management of scientific and administrative data in the field of biomedical research. This system does not enrich the data in any way, and finds no links except those given to it by its operators or revealed by trivial full-text search. It also manages a set of workflows, but does not in any way allow users to reuse their efforts across changes in context.

None of the above provides a system with:
(a) methods for workflow creation and modeling, including:
(i) defining curation actions, decisions, and data states; and
(ii) details of the techniques used in modeling transitions, and other lineage information presented in a provenance language that links curation states and human/machine actions to specific state transitions;
(b) methods for workflow manipulation;
(c) methods for mining semantic dependency among curation actions and object linkage decisions; and
(d) methods for responding to a specific change and for using the dependency among the previous curation actions to identify reusable curation actions and metadata.

What is needed, therefore, is a system that overcomes the above-mentioned limitations and that includes the features enumerated above.

BRIEF SUMMARY OF THE INVENTION

The invention is a data curation system that includes various methods to enable efficient reuse of human and machine effort. To reuse effort, various facilities are presented that model, save, and allow the querying of provenance and state information of a curation workflow and allow for incremental, stateful transitions of the data and the metadata.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Overview

Data integration is (a) mapping schemas of multiple data sources into one global schema, and (b) deduplicating records in such sources. In other words, data integration involves two object linkage exercises: column/field/attribute linkage and row/record linkage.

Data curation is the more broad act of (a) discovering a data source of interest, cleaning and transforming the new data; (b) semantically integrating it (as above) with other local data sources; and (c) deduplicating the resulting composite. Data curation includes schema mapping, record deduplication, transformation, etc.

Figure 1:
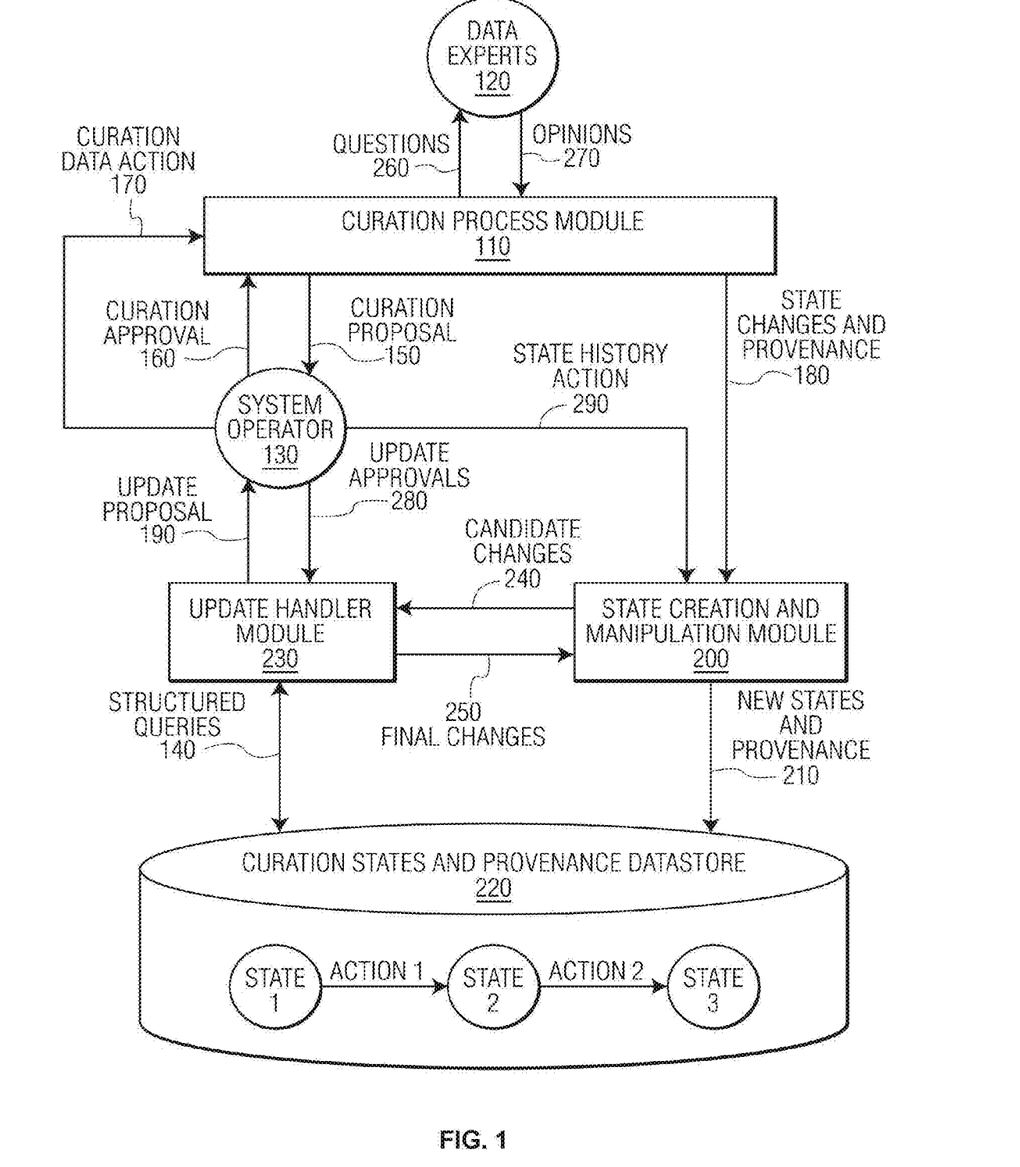
FIG. 1 is a high-level depiction of the subsystems of the current system.

Referring now to FIG. 1, a high-level depiction of the current system. The system has the following major components:

Curation Process Module 110;
State Creation And Manipulation Module 200;
Curation States And Provenance Datastore 220;
Update Handler Module 230; and
Human Players, namely
System Operator 130; and
Data Experts 120.
Curation Process Module 110.

Curation Process Module 110 is a subsystem of the overall system described herein, and this subsystem is described in more detail in U.S. patent application Ser. No. 14/228,546 "METHOD AND SYSTEM FOR LARGE SCALE DATA CURATION" (Bates-Haus et. al, filed 2014 Mar. 28), now U.S. Pat. No. 9,542,412. This subsystem "allows integrating a large number of data sources by normalizing, cleaning, integrating, and deduplicating these data sources. The [sub]system makes a clear separation between the system operator, who is responsible for operating the system (e.g., ingesting data sources, triggering data integration tasks), and data experts who have enough expertise to answer specific questions about the data." [Para. 0020] This subsystem "abstracts schema mapping and record deduplication as object linkage, where an object could refer to a column (i.e., field/attribute) or a row (i.e., a record) in a data source. Such abstraction allows seamless data integration between solutions of both problems. This data integration allows solving the two problems in a holistic way rather than one problem at a time." [Para 0020]

Curation Process Module 110 continuously operates on data, taking raw data (not shown) as input, cleaning it, transforming it, semantically integrating it with other data, and deduplicating the resulting composite. A version of the output, at any given point in time, includes both the data (as currently curated) and metadata (which represents the curation state of the underlying data). Curation state includes details about when and to what extent data curation has occurred (for example, whether or not two objects in the data have been linked) any why (provenance).

Provenance will be discussed further below.

Curation Process Module 110 combines its own machine analysis with input from users (namely, Data Experts 120 and System Operator 130) to propose curation state changes (including linkage changes, transformations, etc.) as one or more Curation Proposal 150 to System Operator 130. For example, when Curation Process Module 110 outputs one or more Curation Proposal 150 to System Operator 130, then System Operator 130 must decide whether or not to issue one or more of corresponding Curation Approval 160 to Curation Process Module 110. If Curation Proposal 150 is approved by System Operator 130 (as Curation Approval 160), then Curation Approval 160 is implemented by Curation Process Module 110, thereby making the approved proposal(s) part of a new linkage state.

Actions that can be taken by System Operator 130 will be discussed further below.

State Creation and Manipulation Module 200.

State Creation and Manipulation Module 220 takes as input a set of deltas and provenance information for each delta. State Creation and Manipulation Module 220 creates and outputs a new system state and appropriate provenance information (collectively New States And Provenance 210).

More specifically, when any change (i.e. delta) has been made to curation state, Curation Process Module 110 outputs State Changes And Provenance 180 to State Creation And Manipulation Module 200. State Changes And Provenance 180 includes metadata, namely state change metadata (e.g. when and to what extent data curation has occurred, how and to what extent the child state differs from the parent state) and provenance metadata (e.g. why a particular change occurred). Provenance metadata includes machine-processable information describing why something is considered true. An example of provenance metadata could also be a notes field indicating that two different fields in the data should no longer be linked because, for example, they do not contain the same data (such as in the "doctor's room number" and "patient's room number" example above). State Creation And Manipulation Module 200 then outputs updated metadata as New States And Provenance 210, which is stored in Curation States And Provenance Datastore 220.

Curation States and Provenance Datastore 220.

Curation States and Provenance Datastore 220 records the history of curation states, as well as the details of each curation state and the provenance of all elements in each curation state. Curation States and Provenance Datastore 220 supports Structured Queries 140 from (and outputs to) Update Handler Module 230.

Update Handler Module 230.

Update Handler Module 230 processes provenance information to understand how changes to curation state affect existing curation state elements. Update Handler Module 230 proposes further changes (as Update Proposal 190) to System Operator 130 to enable consistent provenance, while re-doing as little human work as possible. Update Handler Module 230 can also communicate directly with Curation Process Module 110 (connection not shown) as discussed further below.

Human Players (Curator and Experts).

A curator, System Operator 130, drives the data curation effort. System Operator 130 initiates curation data actions, initiates and approves all state changes in the system, and supervises the integration of machine judgment (from Curation Process Module 110) and human judgment (from Data Experts 120).

Data Experts 120 are the humans whose guidance enables Curation Process Module 110 to make proposals. Data Experts 120 supply the ground truth insight that enable Curation Process Module 110 to function.

Figure 2:
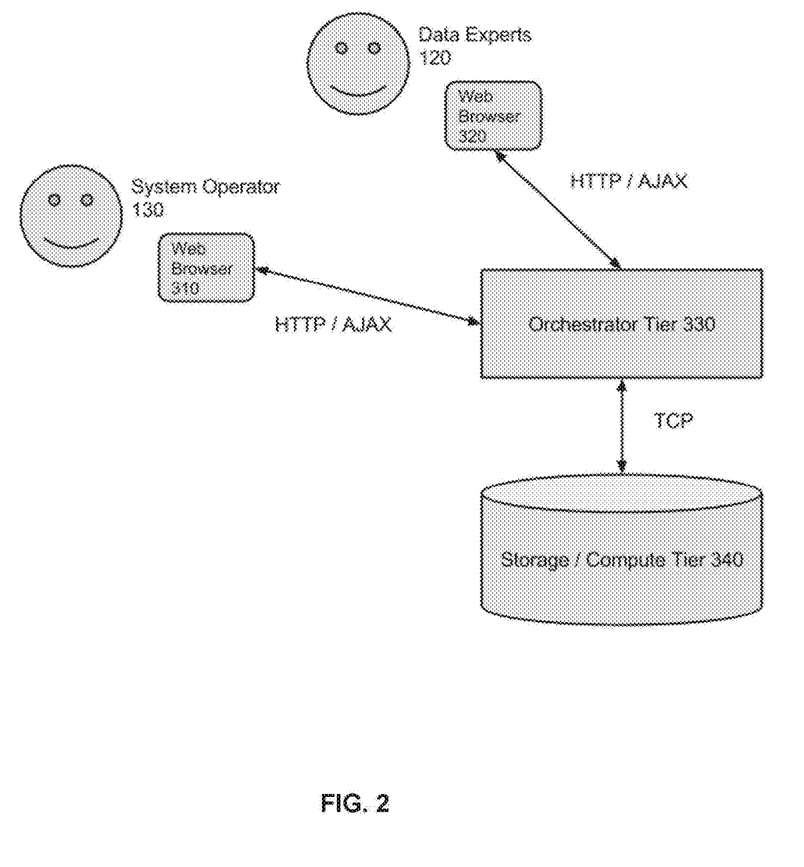
FIG. 2 is system diagram showing hardware components of the system.

Referring now to FIG. 2, is system diagram showing hardware components of the system. Storage/Compute Tier 340 is where all the state is stored and where all the data-scale computations take place. Storage/Compute Tier 340 can be a large-scale traditional RDBMS system like Vertica or Oracle, or it can be a Hadoop cluster, communication with which happens in SQL. Orchestrator Tier 330 can share hardware with Storage/Compute Tier 340 or it can be implemented on separate hardware. If separate, Orchestrator Tier 330 can be run on commodity application server hardware. Orchestrator Tier 330 is where the business logic executes and where human-scale operations take place. Modern web browsers (Web Browser 310 and Web Browser 320) are used to interface users (System Operator 130 and Data Experts 120, respectively) with the application (via Orchestrator Tier 330).

Operation

Types of Curation Actions and Control Flow.

Referring now to the interaction between System Operator 130 and Curation Process Module 110.

There are two types of actions that can be taken by System Operator 130:

1. Curation Data Action 170 instructs Curation Process Module 110 to perform curation (e.g. data loading, transformation, or linkage).

2. State History Action 290 involves the direct manipulation of the state history (e.g. back up to a previous state and start a new branch from there, merge two independent streams of work, re-apply an action from another branch of work) via State Creation And Manipulation Module 200.

Curation Data Action 170 action goes through several phases, described as follows.

Phase 1: Action Initiation.

Curation Data Action 170 is initiated by System Operator 130, or by Curation Process Module 110 at the prior authorization of System Operator 130 (e.g. via a scheduled task). Curation Data Action 170 involves the invocation of one or more of the curation processors available in the system. System Operator 130 (optionally via a graphical computer user interface) provides the system with a definition of which processors to invoke and how to configure them. At this time, System Operator 130 may also provide a dependency processing mode (DPM), or, in preview mode, System Operator 130 may choose to see which state element(s) will be invalidated by the action before deciding on which DPM to use for the action.

Phase 2: Action Processing.

Curation Process Module 110 is configured and invoked against the current curation state and then produces an initial set of changes (State Changes And Provenance 180) to be applied to the curation state in order to make a new curation state. In addition to the deltas (i.e. changes), Curation Process Module 110 may produce a set of suggestions (Curation Proposal 150) for further changes to be applied. With each suggestion may be included a confidence, as for example produced by a linkage classifier. Data Experts 120 may be queried at the discretion of System Operator 130 in the generation of suggestions.

Phase 3: Suggestion Processing.

Any suggestions generated in the Action Processing phase are presented to System Operator 130 for feedback. System Operator 130 may examine individual suggestions and accept (as Curation Approval 160) or reject them. System Operator 130 may also accept or reject suggestions in bulk by providing selection criteria for these suggestions, such as "accept all with confidence above 70%." This process continues until all suggestions are accepted or rejected. The changes represented by any accepted suggestions are added to the set of Candidate Changes 240 to be applied. Candidate Changes 240 are a machine-readable form of Curation Proposal 150, formatted for processing by Update Handler Module 230.

Phase 4: Dependency Identification.

The set of Candidate Changes 240 is sent to Update Handler Module 230. Update Handler Module 230, which computes the set of propagated changes as Update Proposal 190 (i.e. the changes that would result from propagating dependencies from Candidate Changes 240). Update Proposal 190 includes the invalidated state elements (i.e. any state elements invalidated by Candidate Changes 240).

Phase 5: Dependency Review.

If System Operator 130 has not yet provided a dependency processing mode (DPM), then Update Handler Module 230 presents Update Proposal 190 to System Operator 130 for review, and System Operator 130 selects a DPM to use. Optionally, even if System Operator 130 had previously selected a DPM and certain pre-specified conditions are met (e.g. number of invalidated changes exceeds some threshold), then Update Proposal 190 is presented for review and System Operator 130 is given the opportunity to specify a different DPM to use. Based on the DPM, Update Handler Module 230 will decide whether the change should be approved (i.e. allowed to go forward) or rejected. Each proposal may have metadata such as a confidence associated with it in order to allow bulk processing of proposals. The changes approved by System Operator 130 as Update Approvals 280 are Final Changes 250.

Phase 6: New State Creation.

Once Update Approvals 280 have been gathered, Update Handler Module 230 sends Final Changes 250 to State Creation And Manipulation Module 200, which adds them to the original set of Candidate Changes 240 and creates a new curation state by applying these changes to whatever is the current curation state. The current state pointer is then updated to the newly created state, and the new state is made a child of what was the current state at the beginning of the operation.

Curation State.

A curation state consists of the following elements:

1. One or more data sources (not shown);

2. Object linkage facts (not shown) between records or attributes in the data sources;

3. Linkage system state (not shown), including any training data, models, signals, and intermediate state computed during the generation of linkage suggestions;

4. Linkage Questions 260 posed to Data Experts 120; and

5. Linkage Opinions 270 from Data Experts 120 given in response to Questions 260.

Each data source consists of a number of records. Each record is a collection of key-value pairs, with any key appearing zero or more times. A key present on any record of a data source is an attribute associated with the data source of which the record is a part. Attributes that are associated with different data sources are distinct. Records that are part of different data sources are distinct.

Each data source or attribute may have arbitrary structured metadata associated with it.

Object linkage facts come in two varieties:

1. Attribute linkage (i.e. schema mapping for columns/fields/attributes); and

2. Record linkage (i.e. record de-duplication for rows/records).

A linkage fact indicates that two objects (i.e. attributes or records, which may be from the same or different data sources) are linked.

Object linkage facts are transitive. Thus, all attributes and records within the system can be divided into a set of connected components. We call the attribute-connected components "derived attributes" and the record-connected components "derived records." Thus, the curation state implies an integrated derived view of all of the data in the system as a data source, with derived attributes acting as attributes and derived records acting as records. In many (if not most) applications of data curation, the derived data is the ultimate goal of System Operator 130, as it is the derived data that will be used in downstream analysis.

State Creation.

State Creation And Manipulation Module 200 is responsible for creating new states. States that already exist cannot be modified. At any given point in time, one of the states is marked as the current curation state, and states created via actions (e.g. via Curation Data Action 170) will be children of the current curation state. In the figures (FIG. 3, FIG. 4, FIG. 5, and FIG. 6), State 2 (created by Action 1) is the child of State 1.

State Creation And Manipulation Module 200 processes batches of state change commands and creates one new state per batch. See below for how different states are linked via provenance and history. The state change commands include:

1. Add Data—Load a data source or add data to an existing data source.

2. Transform Data—Transform a data source, either in place or to create a new data source.

3. Add Object Linkage Facts—Self-explanatory.

4. Add Linkage Questions 260—Self-explanatory.

5. Accept Linkage Opinions 270—Self-explanatory.

Curation State Provenance.

As System Operator 130 takes curation actions, the curation actions result in a changed curation state. For example, System Operator 130 might direct the system to do one or more of the following:

1. Create new data sources by loading them from external systems or by transformation from existing data sources.

2. Modify data sources by transformation (either creating new attributes derived from existing ones or modifying existing attributes and records).

3. Load object linkage facts into the system.

4. Generate linkage suggestions based on data signals and expert opinions, and accept some of them, resulting in new object linkage facts.

The new curation state created by a curation action will have a number of differences (deltas) from its parent state. For each of these differences, it is possible to record provenance information such as:

1. Which Curation Data Action 170 by System Operator 130 resulted in this difference?

2. Which System Operator 130 took this curation action?

3. What conditions have to hold in order for this element to remain valid? For example:

(a) A linkage fact that was explicitly approved by System Operator 130 is valid unless System Operator 130 withdraws his/her approval.

(b) A linkage model that was created based on some training data might remain valid while a critical mass of training facts remain valid. A critical mass might be defined as a percentage of the data, or in terms of some statistical properties of the training data.

(c) A linkage fact that was implicitly approved by System Operator 130 as part of a bulk approval remains valid as long as it meets the criteria for the bulk approval. E.g.:

(i) Confidence based on model >85%.

(ii) Expert consensus >90%.

(d) Combining (b) and (c) into a single scenario, if a critical number of training facts for a model becomes invalid, then any object linkage facts that were approved in bulk based on confidence scores from that model are also considered potentially invalid.

Each curation element thus derives its validity either from direct approval by System Operator 130 or from some computation involving curation state elements from the parent state, which in turn may have the same relationship with states earlier in the history. Thus, the curation element provenance forms a Directed Acyclic Graph (DAG), with each node without in-edges representing a curation action (e.g. loading data, authoring a transform or approving a linkage fact), and each node with in-edges representing some individual curation state element.

Using a graph traversal, it is thus possible to determine upon which curation state elements an individual element depends, and which ones depend upon it.

Curation State History.

As noted above, each curation action creates a new curation state. The system records a history of all curation states that have ever existed. This creates a directed graph where the nodes are curation states and the edges are curation actions. Using this graph, the system supports standard undo/redo/branch operations, where System Operator 130 can "back up" to a previous curation state (via State History Action 290) and start working from there. The state history storage may be implemented using various mechanisms, for example:

1. At each action, the new state may be written in its entirety separately from the previous state and associated with the action that produced it (i.e. a fully materialized storage system).

2. At each action, the differences between the new state and the previous state may be recorded and associated with the action that produced them (i.e. a delta storage system).

3. In a purely delta storage system, however, queries can become slow due to the large number of deltas to be followed, so parts of the state (or the whole state) can periodically be materialized anew to ensure responsive queries.

4. To ensure responsiveness in the face of a potentially long-running materialization, such materialization can be implemented as a background operation, with queries transitioned from the delta representation to the materialized representation once the materialization has completed.

Any of these (or other) strategies may be applied to disjoint parts of the curation state (e.g. attribute linkage may be copied wholesale, while record linkage may be stored using deltas with periodic materialization).

Each individual curation state is called a version. This terminology is similar to that used with the Git (see www.git-scm.com) data model, where versions form a directed graph. In other words, just as Git software implements version control for source code, the invention implements version control for data curation.

The history graph can also provide a temporal view of dependencies. Because this is a directed graph, all states can be described as ancestors or descendants of any given state (with only the state itself being both ancestor and descendant; all other states are just one or the other). This implies another sense of provenance, with pieces of state being dependent on all previous state(s).

It is also possible for the system to assist a user in combining work from different branches of the version/action graph. In this situation, a new state may be created with two state parents, with the tips of the two branches being combined. This and others similar operations are described further below in the Update Handler Module 230 and State History Actions sections.

Curation Process Module 110.

Curation Process Module 110 generates curation state changes along with provenance information for each state element.

Linkage System.

This system generates linkage suggestions and confidences, and may use human experts and machine-learning-based classifiers to do so. See U.S. patent application Ser. No. 14/228,546, now U.S. Pat. No. 9,542,412 (previously discussed) for details.

Object linkage suggestions are presented to System Operator 130 for approval. System Operator 130 may approve linkage suggestions individually. Since the number of linkage suggestions is usually large, System Operator 130 may choose to approve or reject suggestions in bulk, using criteria based on the curation state, such as data filters, confidence filters, etc.

The provenance of each linkage state element has the following parts:

1. Did System Operator 130 explicitly approve this linkage element? If so, it is considered valid as long as the constituent data presented to System Operator 130 for approval remain the same. For example, it might mean:

(a) For a record linkage fact, this means that the linked records keep the same attributes with the same values.

(b) For an attribute linkage fact, this means that the linked attributes keep the same values in the same records.

2. Did System Operator 130 approve this linkage element as part of a bulk approval based on some criteria? If so, then it is considered valid as long as the criteria remain true. If the criteria involve a confidence from a model, and that model becomes invalid, then the model may be recomputed, subject to the approval of System Operator 130. If the element satisfies the criteria with the new model, then the element remains valid. For example:

(a) Confidence >85%.

(b) Expert consensus >90%.

The provenance of internal linkage elements such as machine learning models is based on the inputs to how those models were computed, including training data and answers to training questions that were approved by System Operator 130.

Transformation System.

The transformation system allows System Operator 130 to modify the data in the data sources that are part of the curation state. The system supports a transformation language for describing how new data is to be generated from existing data. System Operator 130 may also use external tools (e.g. ETL tools) to generate new data based on the old data.

The provenance of each data element output from the transformation system is based on the inputs to the transformation process that generated the given element. As long as the elements that are inputs to the transform remain valid, the output remains valid.

Update Handler Module 230.

Update Handler Module 230 is responsible for propagating changes to curation state to ensure the provenance of all state elements in each curation state is consistent. Update Handler 230 identifies which facts can remain, which facts need to be removed, and which new facts need to be added. In order to do so, Update Handler Module 230 receives from System Operator 130 a Dependency Processing Mode (DPM) (not shown), whose possible values include:

1. RESTRICT—Don't allow new state creation if it will mean invalidating any existing curation state. In this mode, only operations that don't change any existing facts are allowed. Examples include loading new data and loading new curation facts. For example:

(a) Candidate Changes 240 include creating a new attribute in a data source as a function of two other attributes. The new attribute has no linkage to any others. This change is allowed to go forward.

(b) Candidate Changes 240 include reversing the linkage between two attributes. This linkage was used in the training of the record linkage model, and its removal would cause the model to no longer be valid, and, transitively, all of the object linkage facts that rely on the model's confidence outputs to be invalid. This change is rejected.

(c) Candidate Changes 240 include reversing linkage between two records. This linkage fact was used in the training of the record linkage model, but the change is small enough that the record linkage model remains valid. This change is allowed to go forward.

2. PROPAGATE—Use the provenance information of any elements being changed in order to compute further changes whose application would make the provenance of all elements consistent.

(a) Candidate Changes 240 include creating a new attribute in a data source as a function of two other attributes. The new attribute has no linkage to any others. No propagation is required.

(b) Candidate Changes 240 include reversing linkage between two attributes. This linkage was used in the training of the record linkage model, and its removal would cause the model to no longer be valid, and, transitively, all of the object linkage facts that rely on the model's confidence outputs to be invalid. In order to propagate this change:

(i) A new model is computed, potentially including a training phase where Data Experts 120 (and System Operator 130) may be shown some of the model's predictions in order to validate the model's quality.

(ii) The final model's predictions are shown to System Operator 130, who approves the model.

(iii) System Operator 130 may, at this point, be given the opportunity to update any approval/rejection thresholds.

(iv) Any object linkage facts whose confidences under the new model are high enough to meet the bulk approval thresholds provided by System Operator 130 remain facts. Any facts whose confidences are lower than the rejection thresholds are reversed (recorded explicitly to be false).

(v) System Operator 130 may be given an opportunity to select some linkage proposals for manual review by Data Experts 120, and direct approval by System Operator 130.

3. OVERRIDE—Any state elements rendered invalid by the changes are considered approved by System Operator 130. For example, Candidate Changes 240 include reversing linkage between two attributes. This linkage was used in the training of the record linkage model, and its removal would cause the model to no longer be valid, and, transitively, all of the object linkage facts that rely on the model's confidence outputs to be invalid. The model's provenance is updated to include explicit approval by System Operator 130.

Calculating Propagated Changes.

Figure 7:
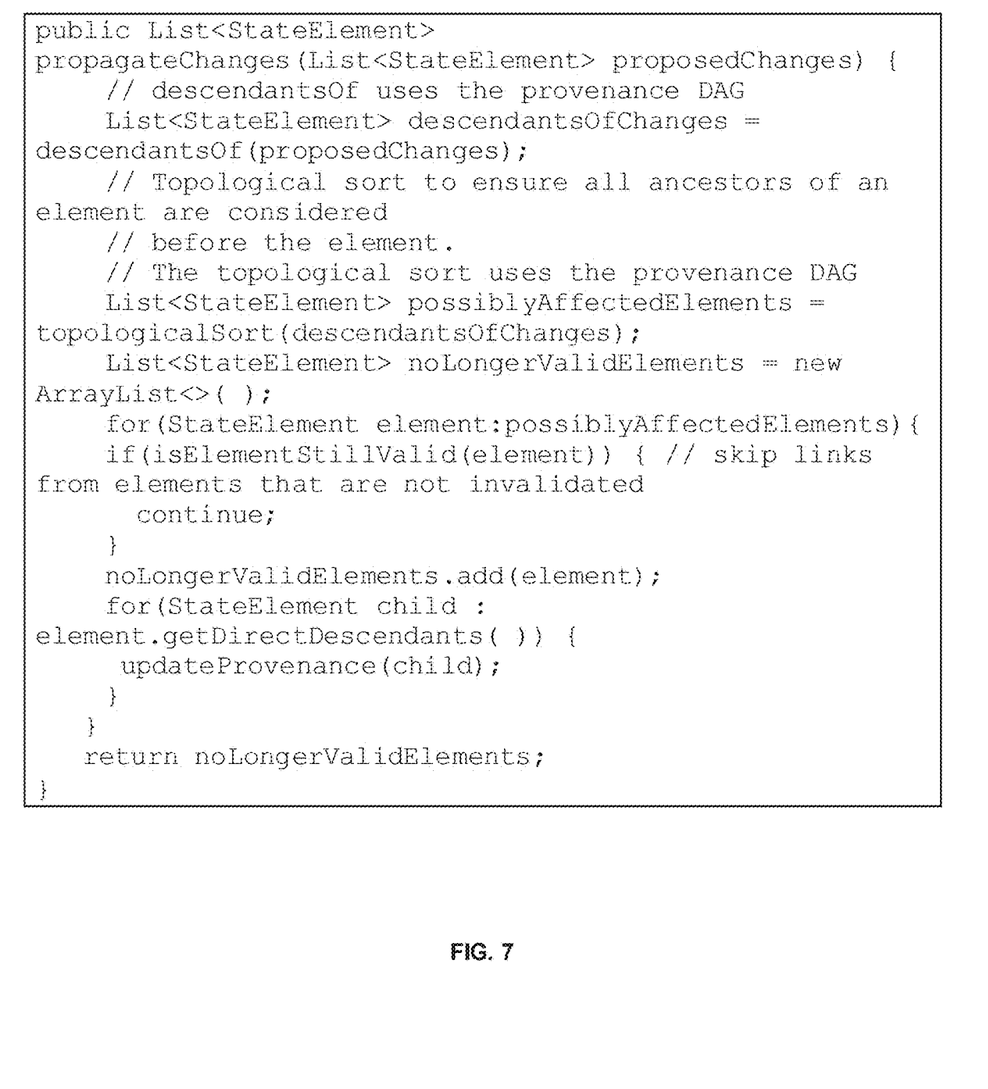
FIG. 7 shows a computer software procedure for computing which elements are no longer valid given proposed changes.

Given a set of proposed changes to be applied to a curation state in order to create a new curation state, the invalidated dependencies can be computed by calculating the set of descendants of all of the proposed changes in the provenance DAG. A computer software procedure to do this might look like what is shown in FIG. 7:

This procedure shown in FIG. 7 computes which elements are no longer valid given the proposed changes. The most pessimistic way to keep the provenance consistent would be to remove all elements that are no longer valid.

Processor—Supported Propagation.

Some curation processors may support less pessimistic propagation. For example:

1. A transform processor could re-apply the transform to changed values that were inputs to a transform.
2. A linkage processor that maintains a connected-components structure could do incremental clustering to ensure that the connected-components structure remains consistent.
3. A linkage classifier could be re-applied to a pair of records or attributes, some of whose constituent data had changed, in order to generate a new linkage proposal.
4. A linkage processor could be re-applied to some subset of the data, where a significant number of constituent values had changed, to generate a new set of linkage proposals.
5. A linkage model rendered invalid by changes might be re-generated using new input from Data Experts 120 and System Operator 130 and re-applied to relevant data to generate updated confidences that would support bulk-approved provenance.

In this case, the no-longer-valid elements would not be removed from the curation state, but instead updates to them could be proposed, possibly with confidence scores, which could then be presented to System Operator 130 for approval.

State History Actions.

Similar to the Git source control system, in this curation system, it is possible to branch from previous system states and to merge two independent branches of work. Such actions are performed by System Operator 130 as one or more of State History Action 290 via State Creation And Manipulation Module 200.

Figure 3:
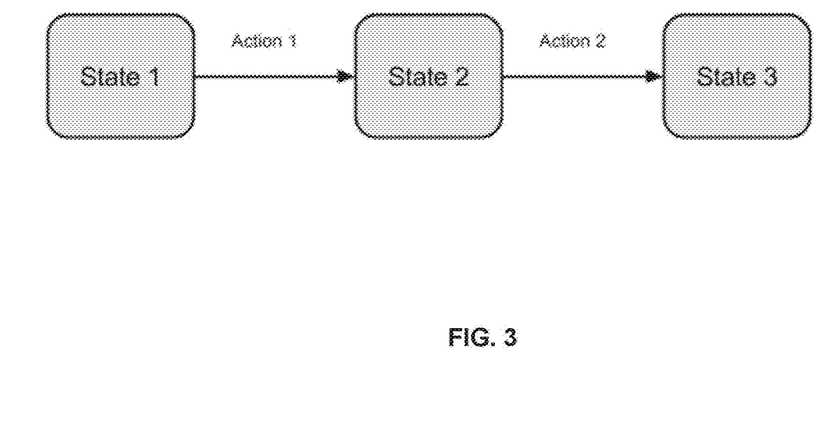
FIG. 3 illustrates basic state history.

FIG. 3 illustrates basic state history.

Branching.

Branching is the simplest of these operations. To branch, the user specifies an identifier for the already existing state from which he/she wants to continue working. Future states are then created as children of the given state.

Figure 4:
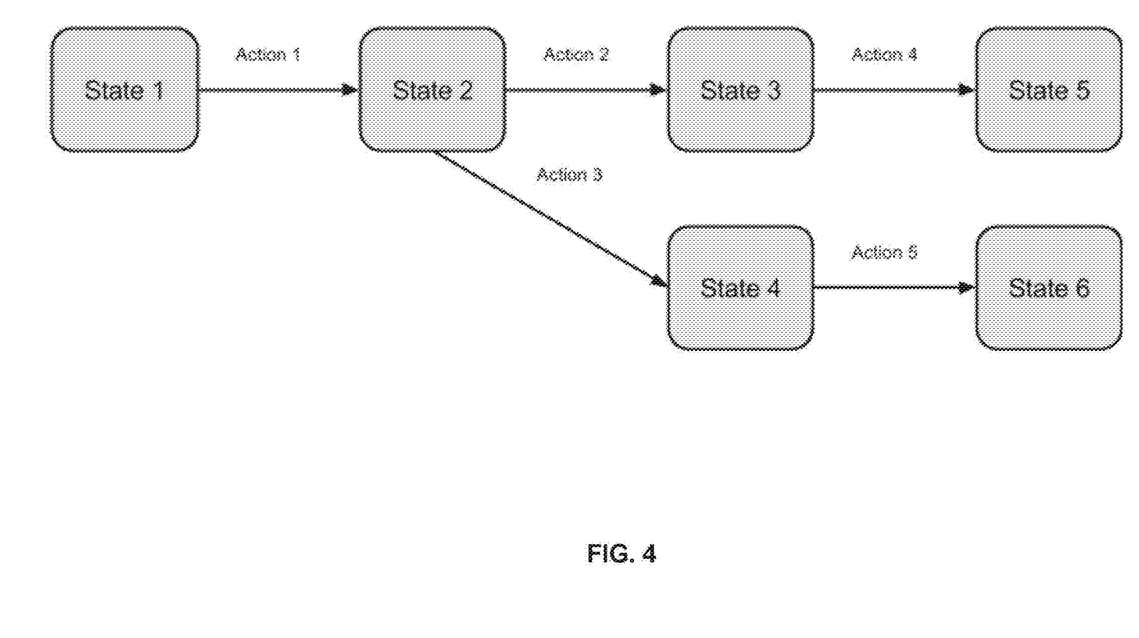
FIG. 4 illustrates state branching.

FIG. 4 illustrates state branching.

Merging Independent Branches of Work.

To process a MERGE action, designate the two branches being merged as (A) and (B). One of the branches will be used as the base of the merge. If the user has specified which one, then use that one. If not, then use the one that is a deeper descendant of the least common ancestor of the tips of A and B. If both are equally deep descendants, then choose whichever was created last.

Without loss of generality (WLOG), suppose that A is the base of the merge. Then, to merge A and B, starting with the action of B originating at the least common ancestor of A and B, replay all actions in B in sequence in PROPAGATE dependency processing mode (DPM).

Figure 5:
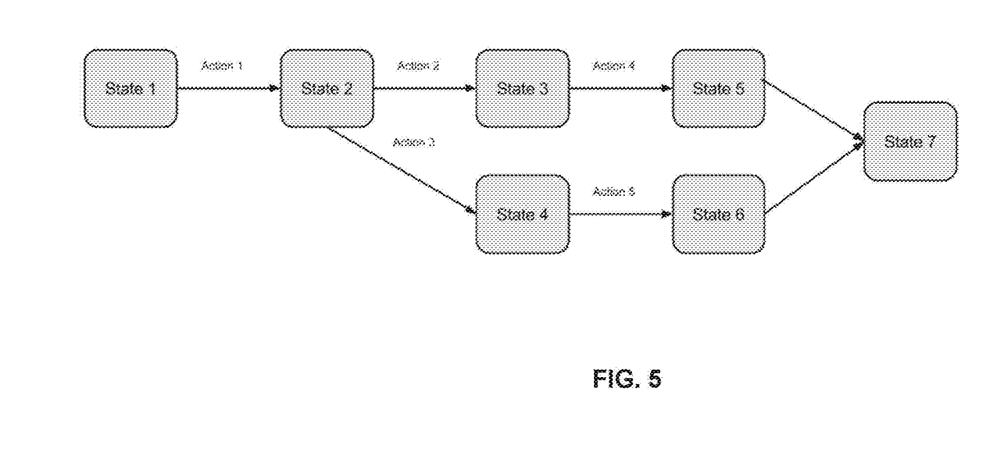
FIG. 5 illustrates state branch merging.

FIG. 5 illustrates state branch merging. In FIG. 5, state 7 embodies the merge of action 3 and 5 with actions 2 and 4.

Figure 6:
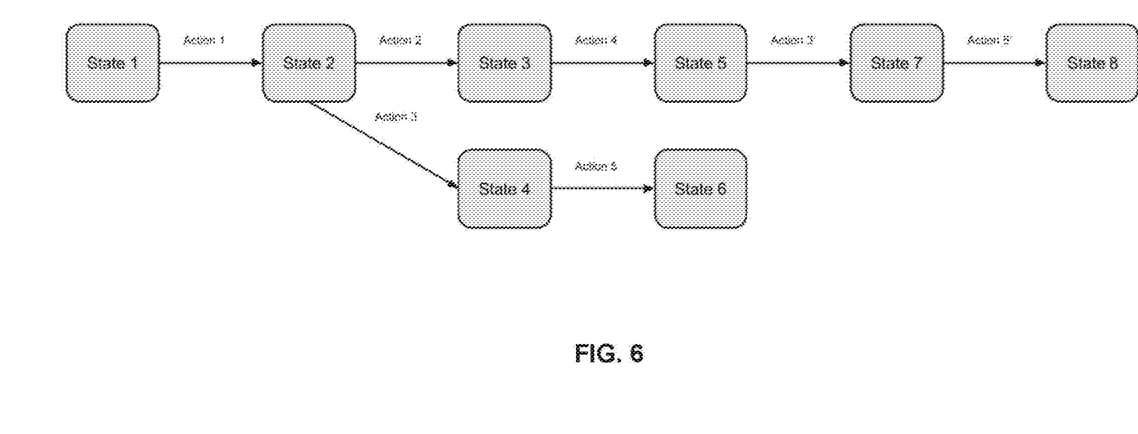
FIG. 6 illustrates state branch rebase.

Rebase, which is similar to merge, is shown in FIG. 6. In FIG. 6, state 8 embodies the rebase (where each action is incrementally reapplied and states are created for each action) of action 3 and 5 with actions 2 and 4.

Other Embodiments

In another embodiment, curation state contains only a portion of the actual data source (rather than the entire data source itself), and the rest of the data source is represented by a data source identifier, such as a pointer or link.

In another embodiment, Curation Process Module 110 drives curation with only guidelines from the System Operator 130, rather than explicit commands/action. This may optionally be embodied as a Curation Supervisor module (not shown). For example, System Operator 130 may provide a desired level of accuracy in linkage as well as a set of desired formats for the data, and the system will take steps as appropriate using the System Operator 130's authorization. The system may encounter points where it cannot proceed without System Operator 130's guidance. At these points, the system may notify System Operator 130 via synchronous communication or by posting a message to a queue or storage medium that System Operator 130 may access asynchronously asking for guidance and help. The system may also expose a dashboard user interface, via which System Operator 130 can inspect system state and view blockages encountered by the system or specific points where the system isn't blocked, but where input from System Operator 130 could make a large difference to the output.

In another embodiment, Structured Queries 140 supports analytics and data-mining operations including, for example:

1. Which parts of an organization's data have strong vs. weak provenance?
2. How well-annotated is the data that comes from different parts of the organization?
3. How widely-used and/or connected is the data from various projects?
4. What is the performance and/or contribution level of individual data experts or system operators?

In another embodiment, the system supports exploratory curation and what-if scenarios including, for example:

1. Suppose an attribute looks like it contains phone number data. What happens if System Operator 130 mark it as such?
2. Suppose some records look like they refer to the same customer. What happens if System Operator 130 links them?
3. If an acceptance threshold is set to 80%, then what will any false-positives look like? What about 85%? 90%?
4. What happens if different instructions are given to Data Experts 120?

In another embodiment, Update Handler Module 230 includes additional features, such as:

1. A setting that affects the degree of pessimism with which state is declared invalid.
2. Leaving updates as unresolved, and allowing curation to proceed, while in the background performing computations polls of Data Experts 120 polls that provide evidence based on which to make higher-confidence proposals.

In another embodiment, version-based storage of state in Curation States And Provenance Datastore 220 enables publishing events via an event queueing system (such as an enterprise event bus). As new states are created, the state changes in those states get added to the queue. If downstream systems are not able to process reversals of linkage but instead are able to process full reloads, then it is possible temporarily to provide invalidated linkage facts explicit provenance in between reloads, and then to provide periodic snapshots for full reload.

In another embodiment, the functions of Update Handler Module 230 and State Creation And Manipulation Module 200 are combined into a combined computer module.

It is to be understood that the above description is intended to be illustrative, and not restrictive. Many other embodiments will be apparent to those of skill in the art upon reviewing the above description. For example, the components of the system (including Curation Process Module 110, State Creation And Manipulation Module 200, Update Handler Module 230, and Curation States And Provenance Datastore 220) can be implemented on various computer hardware platforms (including physical, networked, virtual, and cloud) using various computer software programming languages. The scope of the invention should, therefore, be determined with reference to the appended claims, along with the full scope of equivalents to which such claims are entitled.

What is claimed is:

1. A method for data curation of a data source with version control, wherein the data source to be curated includes one or more records, and each record is a collection of key-value pairs, the method comprising:
    (a) defining a current curation state as a parent state of the data source to be curated, wherein the parent state includes the following elements:
        (i) the data source, including the one or more records, and the key-value pairs of each record,
        (ii) facts about which objects in the data source are linked,
        (iii) linkage system state,
        (iv) questions posed to data experts about the data source, and
        (v) answers received from the data experts about the data source;
    (b) writing the current curation state to a datastore;
    (c) automatically performing a curation data action on the parent state, using a processor, wherein the curation data action causes an action to be taken with respect to the data source, and wherein the curation data action includes at least one of:
        (i) transformation of the data source, either in place or to create a new data source, or
        (ii) linkage, the linkage being adding object linkage facts, or
        (iii) linkage, the linkage being adding linkage questions, or
        (iv) linkage, the linkage being accepting linkage opinions, or
        (v) data loading, the data loading being loading a new data source, or adding data to an existing source;
    (d) automatically creating a child state of the parent state based on the curation data action using a curation process module, thereby causing a new state of the data source to be created;
    (e) identifying which of the elements would be changed by the curation data action;
    (f) identifying all of the changes of the elements between the parent state and the child state using the curation process module;
    (g) identifying provenance information for the changes of the elements between the parent state and the child state using the curation process module, the provenance information including at least one of:
        (i) which of the curation data actions produced the changes, and
        (ii) which conditions have to hold in order for each of the elements to remain valid; and
    (h) writing the child state and the provenance information to the datastore.

2. The method of claim 1 wherein the curation data action is data loading, the data loading being loading a new data source, or adding data to an existing source.

3. The method of claim 1 wherein the curation data action is transformation of the data source, either in place or to create a new data source.

4. The method of claim 1 wherein the curation data action is linkage, the linkage being adding object linkage facts.

5. The method of claim 1 wherein the curation data action is linkage, the linkage being adding linkage questions.

6. The method of claim 1 wherein the curation data action is linkage, the linkage being accepting linkage opinions.

7. The method of claim 1 wherein a plurality of curation data actions are grouped in a batch, and the child state incorporates the batch of curation data actions.

8. The method of claim 1 further comprising:
    (i) generating a curation proposal, the curation proposal being received from a first computer module and being sent to a system operator in human-readable form, and to a second computer module in machine-readable form; and
    (j) approving the curation proposal.

9. The method of claim 1 wherein the curation data action includes a dependency processing mode selected from the group consisting of restrict, propagate, or override.

10. The method of claim 1 wherein the curation data action includes a preview mode.

11. The method of claim 1 wherein the steps (a)-(h) are repeated to form multiple curation states, and wherein a first curation data action changes the curation state from a first state to a second state, and a second curation data action changes the curation state from the second state to a third state, state two being a child state of the parent state, and state three being a child state of states one and two, the method further comprising:
    (i) forming a directed acyclic graph from the provenance information of each of the curation states; and
    (j) using graph traversal on the directed acyclic graph to determine:
        which of the curation states each of the elements depends upon, and
        which of the elements each of the curation states depends upon.

12. A method for data curation of a data source with version control, wherein the data source to be curated includes one or more records, and each record is a collection of key-value pairs, the method comprising:
    (a) defining a current curation state as a parent state of the data source to be curated, wherein the parent state includes the following elements:
        (i) the data source, including the one or more records, and the key-value pairs of each record,
        (ii) facts about which objects in the data source are linked,
        (iii) linkage system state,
        (iv) questions posed to data experts about the data source, and
        (v) answers received from the data experts about the data source;

(b) writing the current curation state to a datastore;

(c) automatically performing a curation data action on the parent state, using a processor, wherein the curation data action causes an action to be taken with respect to the data source, and wherein the curation data action includes at least one of:
  (i) transformation of the data source, either in place or to create a new data source, or
  (ii) linkage, the linkage being adding object linkage facts, or
  (iii) linkage, the linkage being adding linkage questions, or
  (iv) linkage, the linkage being accepting linkage opinions, or
  (v) data loading, the data loading being loading a new data source, or adding data to an existing source;

(d) automatically creating a child state of the parent state based on the curation data action using a curation process module, thereby causing a new state of the data source to be created;

(e) identifying which of the elements would be changed by the curation data action;

(f) automatically identifying all of the changes of the elements between the parent state and the child state using the curation process module;

(g) identifying provenance information for the changes of the elements between the parent state and the child state using the curation process module, the provenance information including why changes of the elements between the parent state and the child state were made; and (h) writing the child state and the provenance information to the datastore.

13. The method of claim 12 wherein the curation data action is data loading, the data loading being loading a new data source, or adding data to an existing source.

14. The method of claim 12 wherein the curation data action is transformation of the data source, either in place or to create a new data source.

15. The method of claim 12 wherein the curation data action is linkage, the linkage being adding object linkage facts.

16. The method of claim 12 wherein the curation data action is linkage, the linkage being adding linkage questions.

17. The method of claim 12 wherein the curation data action is linkage, the linkage being accepting linkage opinions.

18. The method of claim 12 wherein a plurality of curation data actions are grouped in a batch, and the child state incorporates the batch of curation data actions.

19. The method of claim 12 wherein the curation data action includes a dependency processing mode selected from the group consisting of restrict, propagate, or override.

20. The method of claim 12 wherein the curation data action includes a preview mode.

* * * * *